United States Patent
Yoder

[11] Patent Number: 5,826,524
[45] Date of Patent: Oct. 27, 1998

[54] SEED FORMING WHEEL SUPPORT HAVING A LOCKUP LINK

[75] Inventor: Alfred Dean Yoder, Geneseo, Ill.

[73] Assignee: Deere & Company, Moline, Ill.

[21] Appl. No.: 731,474

[22] Filed: Oct. 16, 1996

[51] Int. Cl.[6] ................................................. A01C 5/00
[52] U.S. Cl. .............................. 111/194; 111/60; 111/62; 111/54; 111/66; 172/538
[58] Field of Search .............................. 111/194, 54, 189, 111/52, 193, 140, 195, 196, 190, 191, 53, 55, 60, 62, 136, 137, 66; 172/462, 452, 538

[56] References Cited

U.S. PATENT DOCUMENTS

| | | | |
|---|---|---|---|
| 4,009,668 | 3/1977 | Brass et al. | 111/85 |
| 4,241,674 | 12/1980 | Mellinger | 111/52 |
| 4,307,674 | 12/1981 | Jennings et al. | 111/85 |
| 4,425,857 | 1/1984 | Lienemann et al. | 111/85 |
| 4,477,801 | 10/1984 | Robinson, Jr. et al. | 111/1 X |
| 4,771,713 | 9/1988 | Kinzenbaw | 111/52 |
| 5,163,518 | 11/1992 | Foley | 172/462 |
| 5,398,625 | 3/1995 | Johnson et al. | 111/189 |
| 5,517,932 | 5/1996 | Ott et al. | 111/193 |
| 5,664,507 | 9/1997 | Bergland et al. | 111/140 |

*Primary Examiner*—Terry Lee Melius
*Assistant Examiner*—Victor Batson

[57] ABSTRACT

A support for a seed firming wheel of an agricultural planter. The support comprises a frame member, a link pivotally coupled to the frame member and a spring positioned between the link and frame member. The frame member is also provided with a pivot assembly to which the link is pivotally mounted. The seed firming wheel is rotatively mounted to the link. A lockup link is positioned between the frame member and the link for holding the seed firming wheel in a non-working position.

12 Claims, 3 Drawing Sheets

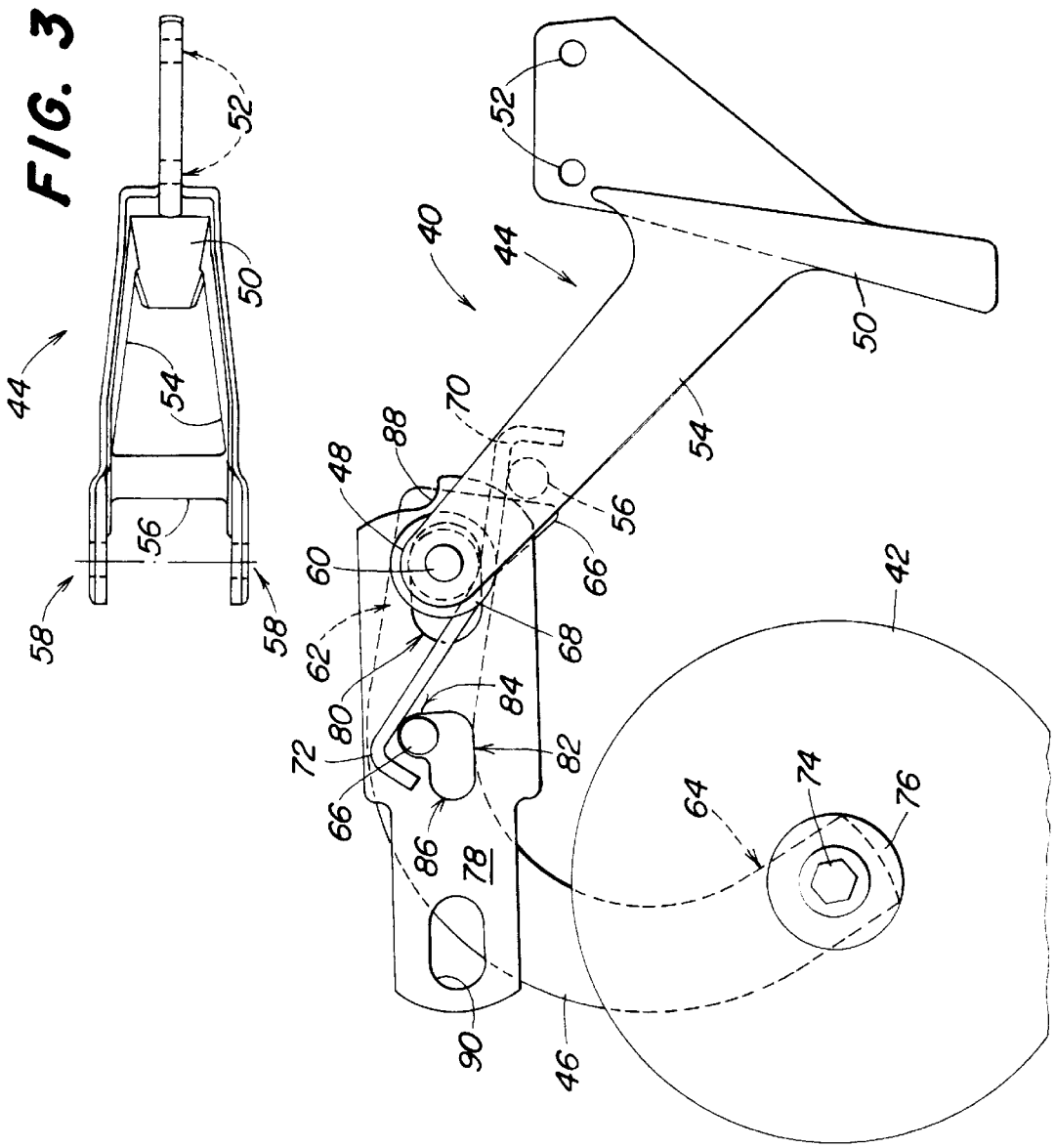

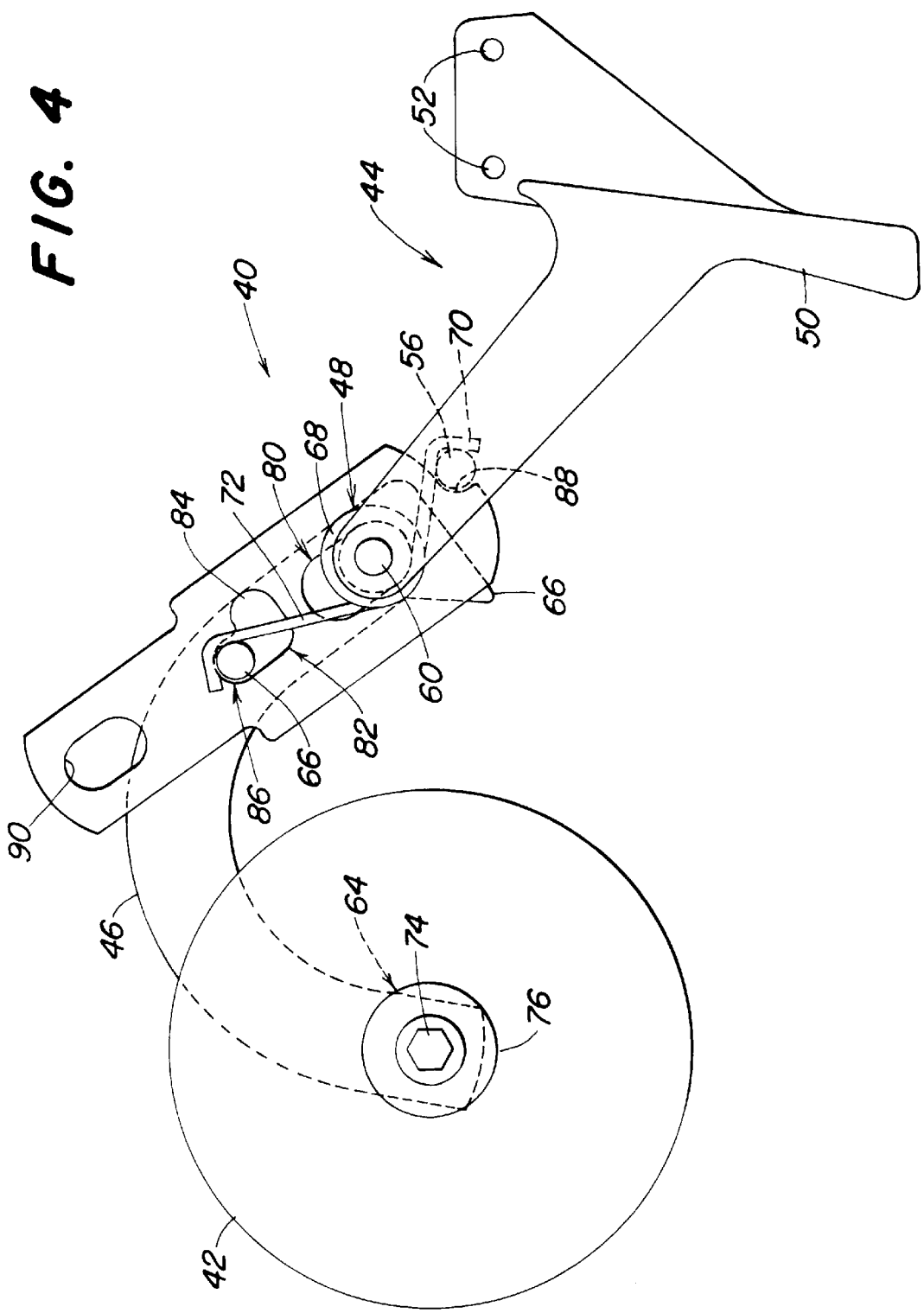

SEED FORMING WHEEL SUPPORT HAVING A LOCKUP LINK

BACKGROUND OF THE INVENTION

1. Field of the Invention

The invention is directed to a support assembly for a seed firming wheel having a lockup link for holding the seed firming wheel in a non-working position.

2. Description of the Prior Art

Row crop planters generally comprise a transverse toolbar having a series of rearwardly extending planting units. These units have a frame to which is mounted a furrow opener for forming a seed planting furrow in the seedbed. The furrow opener maybe provided with depth control wheels for controlling the depth of the furrow. A seed hopper maybe mounted to the frame and direct seed to a seed meter. The seed meter meters the seed and directs the seed through a seed tube to the seed planting furrow formed by the furrow opener.

Following the seed tube are seed firming wheels, press wheels and/or closing wheels. These wheels firm the soil around the seed to obtain good seed-to-soil contact. Seed firming wheels follow the seed tube and run in the seed planting furrow to press seed deposited by the seed tube into the bottom of the seed trench before the seed is covered by closing the furrow. Seed firming wheels maybe spring biased downwardly into contact with the seed trench. Press wheels are used to firm the soil after the seed has been covered by closing the furrow. Closing wheels serve the dual purpose closing the seed trench and firming the seed bed.

In one planter currently on the market, the furrow opener comprises a double disc assembly. The seed tube is positioned between the double discs. A seed tube guard comprising a metal member is positioned in front of the seed tube between the double discs of the furrow opener. Seed tubes are typically made of plastic. If the seed tube does not stay centered in the seed planting furrow, the tube may wear against the rotating disc blades and the blades may eventually wear a hole in the seed tube.

SUMMARY

It is an object of the present invention to provide a support for a seed firming wheel having a lockup assembly to hold the seed firming wheel in a non-working position.

It is a feature of the present invention that the lockup assembly comprises a lockup link having a two-position L-shaped slot.

The seed firming wheel support comprises a rearwardly extending forked frame, a C-shaped link pivotally coupled to the forked frame, a biasing spring positioned between the forked frame and the C-shaped link for biasing the C-shaped link downwardly, and a seed firming wheel rotatively mounted to the C-shaped link. The forked frame is provided with two mounting holes for mounting the forked frame to a row crop planting unit frame. The forked frame extends rearwardly and are provided with two pivot holes for receiving a pivot pin. The C-shaped link is pivotally coupled to the forked frame by the pivot pin. The C-shaped link is also provided with a transversely extending projection. The spring is positioned between the forked frame and the C-shaped link to bias the seed firming wheel downwardly so that the wheel engages the seed planting furrow. A seed firming wheel is rotatively mounted to an axle extending transversely from the C-shaped link. The seed firming wheel is provided with a bearing assembly which engages the axle.

A lockup link can be used to hold the seed firming wheel in either a working or a non-working position. The lockup link is a fore-aft extending link having a fore-aft extending first slot through which the pivot pin extends. The lockup link is provided with a two-position L-shaped second slot defining a working position and a non-working position for the seed firming wheel. The transversely extending projection of the C-shaped link extends into this second slot. The lockup link is also provided with a lockup arm which contacts a lockup stop located on the forked frame. The lockup link is also provided with a fore-aft extending third slot which can be used as means for adjusting the link.

BRIEF DESCRIPTION OF THE DRAWINGS

FIG. 2 is an enlarged side view of the present invention in its working position.

FIG. 3 is a top view of the forked frame of the present invention.

FIG. 4 is an enlarged side view of the present invention in its non-working position.

DETAILED DESCRIPTION

Figure 1:
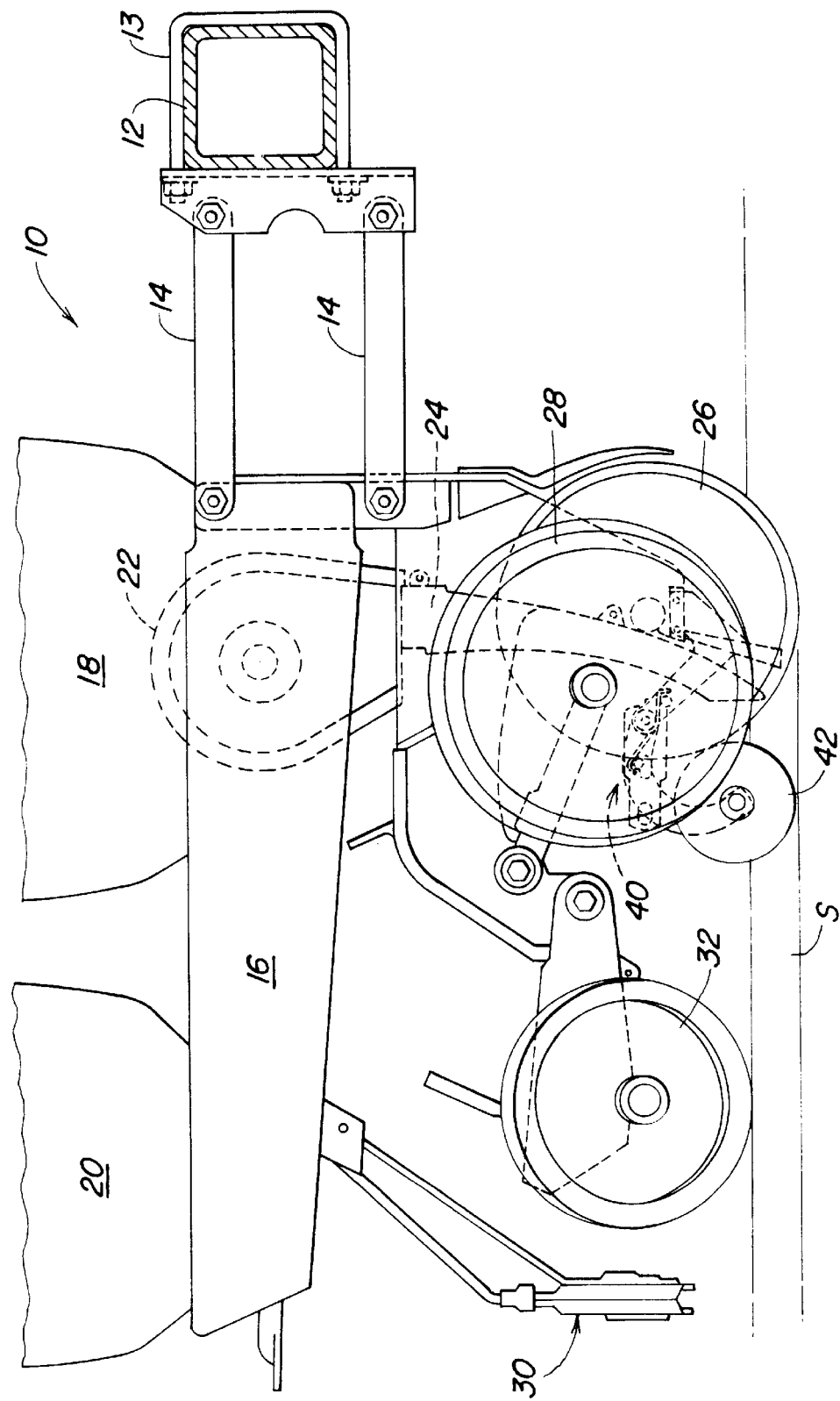
FIG. 1 is a side view of a row crop planting unit having the present invention.

FIG. 1 illustrates a row crop planting unit 10 that is mounted to toolbar 12 by U-bolts 13. Parallel linkage 14 extends between toolbar 12 and the planting unit 10. The frame 16 of the planting unit supports a seed hopper 18 and a granular pesticide hopper 20. Seed in the seed hopper 18 is directed to seed meter 22 which controls the rate of application of the seed. The seed is taken from the seed meter by seed tube 24 and directed to a seed planting furrow S formed by furrow opener 26. Gauge wheels 28 control the depth of the seed trench formed by the furrow opener. The granular pesticide hopper directs dry granular chemical to a chemical meter, not shown, which in turn directs the pesticide to applicator assembly 30. A pair of closing wheels 32 are rotatively mounted to the frame 16. They are located directly behind and on either side of the seed planting furrow. All of the above described elements are relatively conventional.

The subject invention is directed to the configuration of the support 40 for mounting the seed firming wheel 42 the planting unit 10. The seed firming wheel support 40 comprises a frame member 44, a C-shaped link 46 pivotally coupled to the frame member 44, a biasing spring 48 positioned between the frame member 44 and the C-shaped link 46 for biasing the C-shaped link downwardly, and a seed firming wheel 42 rotatively mounted to the C-shaped link 46.

The frame member 44 is provided with a seed tube guard portion 50 having mounting holes 52 for mounting the frame member 44 to the planting unit frame 16. Extending rearwardly from the guard portion 50 are two arms 54. Arms 54 are linked together by a cross member 56. The seed guard portion 50, the two rearwardly extending arms 54 and the cross member 56 define a rectangular seed tube opening though which the seed tube 24 is inserted. The rearwardly extending arms 54 ensure that the seed tube 24 will stay centered in the seed planting furrow S. The seed tube guard portion 50, the rearwardly extending arms 54 and the cross member 56 are integrally formed.

The rearwardly extending arms 54 of the frame member 44 extend past the cross member 56 and are provided with two pivot holes 58 for receiving a pivot pin 60. The C-shaped link 46 has forward end 62 and a rearward end 64. The forward end 62 is provided with a pivot hole, whereas the rearward 64 end is provided with an axle hole. The pivot pin 60 extends between the two rearwardly extending arms 54 of the frame member 44, passing through the pivot hole of the C-shaped link 46, pivotally coupling the link to the frame member 44. A stop arm 66 extends from the C-shaped link 46 and contacts a stop formed by the cross member 56 of the frame member 44 to limit the downward movement of the C-shaped 46 link relative to the frame member 44. The C-shaped link 46 is also provided with a transversely extending projection 67.

The spring 48 is positioned between the frame member 44 and the C-shaped link 46 to bias the seed firming wheel 42 downwardly so that the wheel engages the seed planting furrow S. The spring 48 comprises a torsion coil spring having a helical coil 68 that is wrapped about the pivot pin 60. The torsion spring 48 has two tangentially extending ends 70 and 72, respectively. The first end 70 bears against the cross member 56 of the frame member 44 and the second end 72 bears against the transversely extending projection 67 of the C-shaped link 46.

The seed firming wheel 42 is rotatively mounted to an axle formed by bolt 74 extending transversely from the axle hole of the C-shaped link 46. The seed firming wheel 42 is provided with a bearing assembly 76 which engages the axle 74.

A lockup link 78 can be used to hold the seed firming wheel 42 in either a working (FIG. 2) or a non-working position (FIG. 4). The lockup link 78 is a fore-aft extending link having a fore-aft extending first slot 80 through which the pivot pin 60 extends. The lockup link 78 is provided with a two-position L-shaped second slot 82 Having a first position 84 defining a working position and a second position 86 defining a non-working position for the seed firming wheel 42. The transversely extending projection 67 of the C-shaped link 46 extends into this second slot 82. The lockup link 78 is also provided with a lockup surface 88 which contacts a lockup stop formed by the cross member 56 of the frame member 44. The lockup link 78 is also provided with a fore-aft extending third slot 90 which can be used as a means of adjusting the lockup link 78.

In moving the seed firming wheel 42 from its working position to its non-working position, the operator first lifts the seed firming wheel relative to the frame member 44. This can be done by putting a board on the ground placing the seed firming wheel 42 on the board so that the weight of the planting unit 10 compresses the biasing spring and forces the wheel upwardly. The operator then rotates and slides the lockup link 78 forward until lockup surface 88 engages cross member 56 and transverse projection 67 is positioned in the non-working position 86 of the second slot 82.

In moving the seed firming wheel 42 from its non-working position to its working position, the operator again lifts the seed firming wheel 42 relative to the frame member 44. The operator then pulls the lockup link rearwardly until the transverse projection 67 is inserted into the working position 84 of the second slot 82. The seed firming wheel 42 is released and is placed in its working position.

The invention should not be limited by the above-described embodiment, but should be limited solely by the claims that follow.

I claim:

1. A support for a seed firming wheel of an agricultural planter, the support comprising:
    a frame member having a mounting assembly for mounting the frame member to an agricultural planter, the frame member is also provided with a pivot assembly;
    a link is pivotally mounted to the pivot assembly of the frame member;
    the seed firming wheel is rotatively mounted to the link for firming seeds in a seed planting furrow; and
    a lockup link for locking the seed firming wheel in a non-working position relative to the agricultural planter, the lockup link extends between the frame member and the link.

2. A support as defined by claim 1 wherein the lockup link is provided with a fore-aft extending first slot which is pivotally coupled to the pivot assembly of the frame member.

3. A support as defined by claim 2 wherein the lockup link is provided with a two-position second slot and the link is provided with a transversely extending projection that engages the second slot.

4. A support as defined by claim 3 wherein the two-position second slot is L-shaped.

5. A support as defined by claim 4 wherein the lockup link is provided with a stop surface that bears against a lockup stop on the frame member to lock the seed firming wheel in its non-working position.

6. A support as defined by claim 5 wherein a spring is positioned between the frame member and the link for biasing the seed firming wheel downwardly into contact with the seed planting furrow.

7. An agricultural planter for applying seeds to a field, the planter comprising:
    a frame;
    a seed meter mounted to the frame for controlling the rate at which seeds are applied to a field;
    a furrow opener mounted to the frame for opening a seed planting furrow to which seeds are applied from the seed meter;
    a seed tube extends from the seed meter to the seed planting furrow for directing seeds into the seed planting furrow;
    a seed firming wheel located behind the furrow opener in the seed planting furrow formed by the furrow opener, the seed firming wheel is provided with a support comprising a frame member which is mounted to the frame, the frame member is also provided with a pivot assembly, a link is pivotally mounted to the pivot assembly of the frame member, the seed firming wheel is rotatively mounted to the link for firming seeds in the seed planting furrow, and a lockup link for locking the seed firming wheel in a non-working position relative the furrow opener, the lockup link extends between the frame member and the link.

8. An agricultural planter as defined by claim 7 wherein the lockup link is provided with a fore-aft extending first slot which is pivotally coupled to the pivot assembly of the frame member.

9. An agricultural planter as defined by claim 8 wherein the lockup link is provided with a two-position second slot and the link is provided with a transversely extending projection that engages the second slot.

10. An agricultural planter as defined by claim 9 wherein the two-position second slot is L-shaped.

11. An agricultural planter as defined by claim 10 wherein the lockup link is provided with a stop surface that bears against a lockup stop on the frame member to lock the seed firming wheel in its non-working position.

12. An agricultural planter as defined by claim 11 wherein a spring is positioned between the frame member and the link for biassing the seed firming wheel downwardly into contact with the a seed planting furrow.

* * * * *

UNITED STATES PATENT AND TRADEMARK OFFICE
CERTIFICATE OF CORRECTION

PATENT NO.   : 5,826,524
DATED        : October 27, 1998
INVENTOR(S)  : Alfred Dean Yoder It is certified that error appears in the above-indentified patent and that said Letters Patent is hereby corrected as shown below:

On the title page, item [54] and column 1, line 1;
Please correct title to read as follows:

SEED FIRMING WHEEL SUPPORT HAVING A LOCKUP LINK

Signed and Sealed this

Twenty-third Day of November, 1999

Attest:

Q. TODD DICKINSON

*Attesting Officer*    *Acting Commissioner of Patents and Trademarks*